US006853714B2

(12) United States Patent
Liljestrand et al.

(10) Patent No.: US 6,853,714 B2
(45) Date of Patent: Feb. 8, 2005

(54) APPARATUS AND METHOD FOR PROVIDING ENHANCED TELECOMMUNICATIONS SERVICES

(76) Inventors: Keith A. Liljestrand, 3817 Pilot Dr., Plano, TX (US) 75025; Christopher G. Kingsley, 532 Arbor Brook La., Coppell, TX (US) 75019; Jeffrey R. Myint, 3912 Pine Valley Dr., Plano, TX (US) 75025

(*) Notice: Subject to any disclaimer, the term of this patent is extended or adjusted under 35 U.S.C. 154(b) by 565 days.

(21) Appl. No.: 09/792,207

(22) Filed: Feb. 23, 2001

(65) Prior Publication Data

US 2001/0038689 A1 Nov. 8, 2001

Related U.S. Application Data

(60) Provisional application No. 60/185,204, filed on Feb. 25, 2000.

(51) Int. Cl.[7] ............................................... H04M 3/42
(52) U.S. Cl. .............................. 379/201.03; 379/201.02
(58) Field of Search ........................... 379/88.01, 88.13, 379/88.17, 201.02, 201.03, 900, 88.04, 88.11, 88.16, 88.18, 205.09; 370/352

(56) References Cited

U.S. PATENT DOCUMENTS

| | | | | |
|---|---|---|---|---|
| 5,724,092 A | * | 3/1998 | Davidsohn et al. | 348/14.01 |
| 6,014,437 A | | 1/2000 | Acker et al. | 379/219 |
| 6,075,843 A | * | 6/2000 | Cave | 379/88.13 |
| 6,130,933 A | * | 10/2000 | Miloslavsky | 379/90.01 |
| 6,141,413 A | * | 10/2000 | Waldner et al. | 379/88.17 |
| 6,249,815 B1 | * | 6/2001 | Foladare et al. | 709/223 |
| 6,263,064 B1 | * | 7/2001 | O'Neal et al. | 379/201.03 |

FOREIGN PATENT DOCUMENTS

WO   WO 99/51012   10/1999

OTHER PUBLICATIONS

Alix Leconte, Bjorn Christensen, Steve Cannon and V. Francavilla; "*IN value added*"—*the role of the IP/SN in IN and Multimedia Applications*; ISS '95; World Telecommunications Congress (International Switching Symposium), Advanced Switching Technologies for Universal Telecommunications at the Beginning of the 21st Century; vol. 1; Apr. 23, 1995; pp. 206–210.

E.S.P. Allard and N. Day; *Switching of Information Services in the UK Network and Evolution Towards the Intelligent Network*; Innovations in Switching Technology, Proceedings of the International Switching Symposium; vol. 1; May 28, 1990–Jun. 1, 1990; pp. 119–122.

International Search Report dated Sep. 12, 2001.

\* cited by examiner

*Primary Examiner*—Bing Q. Bui
(74) *Attorney, Agent, or Firm*—Thrasher Assoc. L.L.C.

(57) ABSTRACT

An apparatus and method is disclosed for providing transparent enhanced telecommunications services to subscribers by implementing an enhanced services platform on a local network exchange within the public telephone network. More specifically, the apparatus and method of the present invention is capable of providing a plurality of enhanced telecommunications services to a subscriber by using a voice-activated interface to enable the subscriber to access at least one of the plurality of enhanced telecommunications services. In addition, the apparatus and method of the present invention may use a web-activated interface to enable the subscriber to access at least one of the plurality of enhanced telecommunications services.

9 Claims, 10 Drawing Sheets

APPARATUS AND METHOD FOR PROVIDING ENHANCED TELECOMMUNICATIONS SERVICES

CROSS REFERENCE TO RELATED PROVISIONAL APPLICATION

This patent application claims the benefit of priority from, and incorporates by reference, the entire disclosure of U.S. Provisional Patent Application Ser. No. 60/185,204 filed on Feb. 25, 2000 now abandoned.

BACKGROUND OF THE INVENTION

1. Technical Field of Invention

The present invention relates generally to telecommunications systems, and in particular, to a method and apparatus for providing enhanced telecommunications services to a subscriber.

2. Description of Related Art

Historically, the public telephone network (PTN) has included large, monopolistic entities that control connectivity and transport at the local exchange (LE) level (local loop). The resulting technologies created by these entities, sometime decades old, has left an expensive, proprietary, non-integrating network that is incapable of handling the rapidly changing marketplace.

The deregulation of the local phone monopolies in 1996 has begun to spawn an emerging competitive market that requires new technological advancements in order to leverage new enhanced services, while still providing cost-effectiveness. There are two different business models evident amongst the new local telephone carriers—low cost producer or differentiator. These business models are creating market drivers for less costly, more scalable programmable switching platforms that are also built to allow seamless integration of peripheral components for profitable, differentiating services.

Such enhanced services include single number access services, unified messaging, recording, specialized call routing and specialized call terminating treatment. All of these enhanced services have been created with today's telephone in mind, which uses a simplistic touch-tone dial pad user-interface. Trying to implement these enhanced services with the touch-tone dial pad has led to more complicated service codes, access codes and scheduling requirements, which has further led to a lack of interest in these services by many subscribers. In addition, the architecture of today's enhanced service platforms does not allow for seamless integration with the proprietary PTN, causing many new local telephone carriers to avoid offering these enhanced services to subscribers.

For example, referring to FIG. 1, there is illustrated a traditional enhanced service platform 100 capable of providing enhanced telecommunications services to subscribers 150. The service platform 100 is operated by a service provider and connected to the public telephone network (PTN) 102, such as the Public Switched Telephone Network (PSTN) or Public Land Mobile Network (PLMN). The traditional service platform 100 is shown positioned outside of the PTN 102 due to the lack of flexibility in services traditionally provided by the PTN 102, as described above.

By positioning the traditional service platform 100 outside the PTN 102, the subscriber 150 is forced to call through the PTN 102 to reach the service platform 100 and then call back through the PTN 102 in order to connect with a called party. For example, traditionally, in order to use one of the enhanced telecommunications services provided by the service platform 100, a subscriber 150 must dial a service code to connect to the service platform 100 through the PTN 102 in order to retrieve the desired service, and then dial a called party number to connect with a called party again through the PTN 102 using the desired service.

This type of call procedure and call routing does not allow a service provider to provide transparent enhanced telecommunications services to a subscriber 150. Transparent communication services enable the subscriber 150, for example, to simply pick up a phone and call a person without forcing the subscriber 150 to perform an intermediate step (e.g. first calling the service platform 100 before calling the person). Moreover, since the subscriber 150 generally uses the touch-tone dial pad on their phone to dial the specific service code (e.g. *xx) associated with the service that the subscriber 150 wants to use, requiring the subscriber 150 to use such a touch-tone dial pad presents problems for the subscriber 150 who wants to utilize a hands-free unit or otherwise be hands-free. Likewise, the use of a touch-tone dial pad limits the ability of the subscriber 150 to be hands-free when receiving incoming calls during a call.

It is, therefore, an object of the present invention to provide transparent enhanced telecommunications services to subscribers.

It is a further object of the present invention to implement an enhanced service platform within the public telephone network.

It is still a further object of the present invention to provide a new telephone interface within the enhanced service platform that is voice-activated.

It is still a further object of the present invention to provide a web-activated interface within the enhanced service platform.

SUMMARY OF THE INVENTION

The present invention is directed to an apparatus and method for providing a plurality of transparent enhanced telecommunications services to subscribers by implementing an enhanced services platform on a local network exchange within the public telephone network. More specifically, the apparatus and method of the present invention is capable of providing a plurality of enhanced telecommunications services to a subscriber by using a voice-activated interface to enable the subscriber to access at least one of the plurality of enhanced telecommunications services. In addition, the apparatus and method of the present invention may use a web-activated interface to enable the subscriber to access at least one of the plurality of enhanced telecommunications services.

BRIEF DESCRIPTION OF THE DRAWINGS

A more complete understanding of the method and apparatus of the present invention may be had by reference to the following detailed description when taken in conjunction with the accompanying drawings wherein.

DETAILED DESCRIPTION OF THE PRESENTLY PREFERRED EXEMPLARY EMBODIMENTS

The numerous innovative teachings of the present application will be described with particular reference to the presently preferred exemplary embodiments. However, it should be understood that this class of embodiments provides only a few examples of the many advantageous uses of the innovative teachings herein. In general, statements made in the specification of the present application do not necessarily delimit any of the various claimed inventions. Moreover, some statements may apply to some inventive features but not to others.

Figure 1:
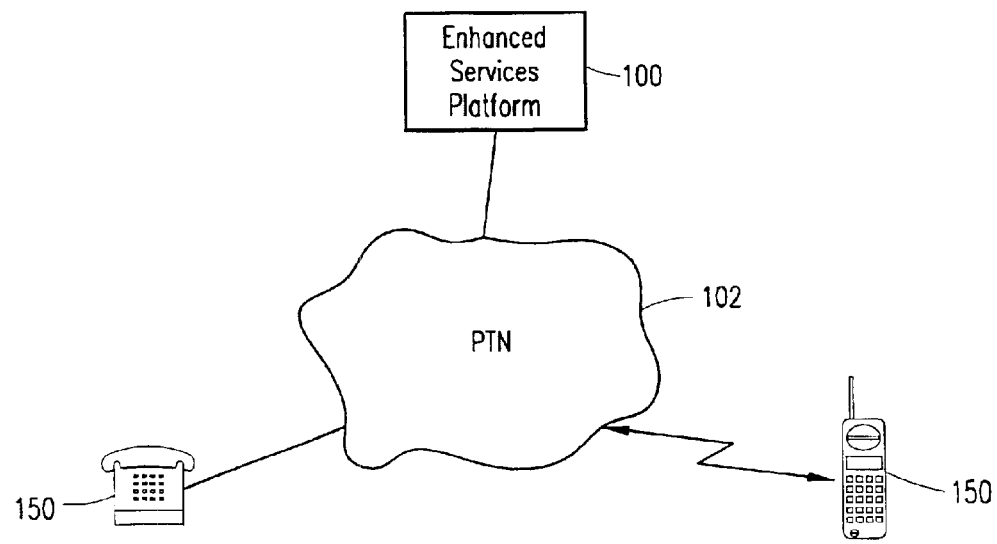
FIG. 1, prior art, is a block diagram illustrating a traditional services platform located outside of a public telephone network.
Figure 2:
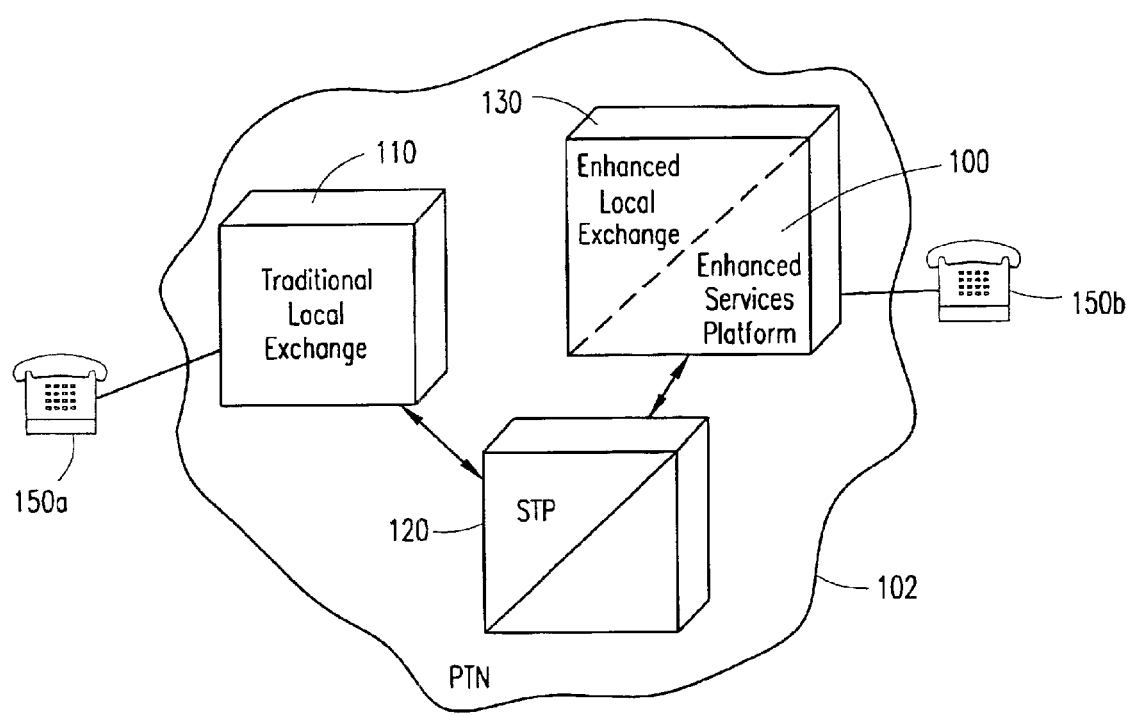
FIG. 2 is a block diagram illustrating an exemplary enhanced services platform located within an enhanced local network exchange within the public telephone network in accordance with the present invention.

Referring to FIG. 2 of the drawings, there is a block diagram illustrating an exemplary enhanced services platform 100 located within a traditional public telephone network (PTN) 102. The PTN can be, for example, a Public Switched Telephone Network (PSTN) or a Public Land Mobile Network (PLMN). The enhanced services platform 100 is implemented on an enhanced local exchange 130 (e.g. a central office switch within the PSTN or mobile switching center/home location register within the PLMN).

The enhanced local exchange (ELE) 130 is a highly reliable switch that integrates a variety of revenue-generating enhanced services, such as pre-and post-paid calling services, voice-activated subscriber services, and various forms of messaging via the enhanced services platform 100. The ELE 130 preferably supports T1/E1, as well as ANSI and ITU Primary Rate ISDN, and SS7 in a compact footprint. In addition to supporting all standard network interfaces, the ELE 130 may also operate as a Remote Access or Voice Over IP gateway.

Flexible routing tables are preferably included within the ELE 130 to provide multiple options, such as Least-Cost Routing, Time-of-Day, and Trunk Group Overflow, with a Graphical User Interface (GUI) to implement changes quickly and easily. The ELE 130 is easily maintained with important operations, administration and maintenance features, such as remote maintenance and administration, and real-time alarming and monitoring.

Since the ELE 130 is designed for in-service system growth, the ELE 130 can seamlessly grow as business demand increases. Cost-effective in a wide variety of configurations and capacities, an ELE 130 can begin as low as 192 DS0 ports and grow to more than 30,000 non-blocking ports. Standard single-bay designs preferably support up to 3840 ports and standard dual-bay systems up to 11,520 ports.

The enhanced services platform 100 utilizes a voice-activated and possibly a web-activated user-interface to allow access to enhanced telecommunications services. To access the voice-activated interface within the enhanced services platform 100, the subscriber 150a need only dial his/her own phone number. Once connected to the platform 100, a "virtual administrator" associated with the voice-activated interface within the enhanced services platform 100 takes over to assist the subscriber 150a in requesting/performing all desired services via the voice-activated interface. For example, the "virtual administrator" can prompt the subscriber 150a for a voice command, and the subscriber 150a can reply by saying "Call Mike." The "virtual administrator" connects the subscriber 150a to the called subscriber 150b (Mike) without the subscriber 150a ever dialing Mike's number.

To determine the routing information for the called subscriber 150b, the "virtual administrator" accesses a database within the enhanced services platform 100, which stores called party numbers and associated names (or other type of spoken identity data). The subscriber 150a can update the database through the voice-activated interface or via the web-activated interface.

With this type of natural interface, applications can become more complex without becoming more difficult to use. For example, utilizing voice commands instead of service codes and phone numbers saves the subscriber 150a considerable time associated with various communications tasks. Phone tag can be virtually eliminated and conference calls can be made on demand. Furthermore, call announcements and customized routing make calls from any telephone more productive.

The platform 100 offers three types of service: (1) basic local service; (2) virtual office phone (basic); and (3) virtual office services (advanced). The basic local service corresponds to today's traditional local exchange offering of basic dial tone, access to long distance, and possibly a few basic Class 5 features. The virtual office phone (basic) service includes the voice-activated and web-activated interfaces, and the following features: (1) Call Waiting; (2) Call Transfer; (3) Call Forwarding; (4) Call Swapping; (5) Call Disconnect; (6) Sequential Calling; (7) Voice Dialing By Number; and (8) Redial. The virtual office service (advanced) builds on the basic local service and virtual office phone (basic) with the following advanced service features: (1) Caller I.D.; (2) Caller I.D. History; (3) Conferencing Features (On Demand, Meet Me); and (4) Contact List/Dialing by Name.

In addition to the above listed features, the platform 100 also offers more advanced services, such as a unified messaging service, a single number access service and a recording service, each of which will be described in more detail below. Briefly, the unified messaging service provides voice mail, e-mail, fax and message delivery features. The unified messaging voice mail feature provides general store and forward, reply, callback, phone or Internet (multimedia) retrieval and networking services. The e-mail feature provides forwarding, reply, Internet retrieval and phone retrieval (text-to-speech) services. The fax feature provides Internet retrieval, phone retrieval (text-to-speech), voice attachment and store and forward services. Finally, the message delivery feature provides Short Message Service (SMS), pager, voice and message forwarding services.

The single number access service assigns a single dialable number to a subscriber, which is used to route incoming calls to the subscriber. Incoming calls can terminate at any communications device (wireline phone, wireless phone, pager, fax machine, e-mail address, voice mail box, etc.). The single number access service also includes the following features: call forwarding, route lists and schedules, VIP exceptions, extended absence, sequential or broadcast search, call screening and paging.

The recording service allows a subscriber to record a conversation. The following features, at a minimum, make up the recording service: recording on demand, record all calls, playback options, phone/Internet, start/stop, pause, delete, fast forward and rewind.

Figure 3A:
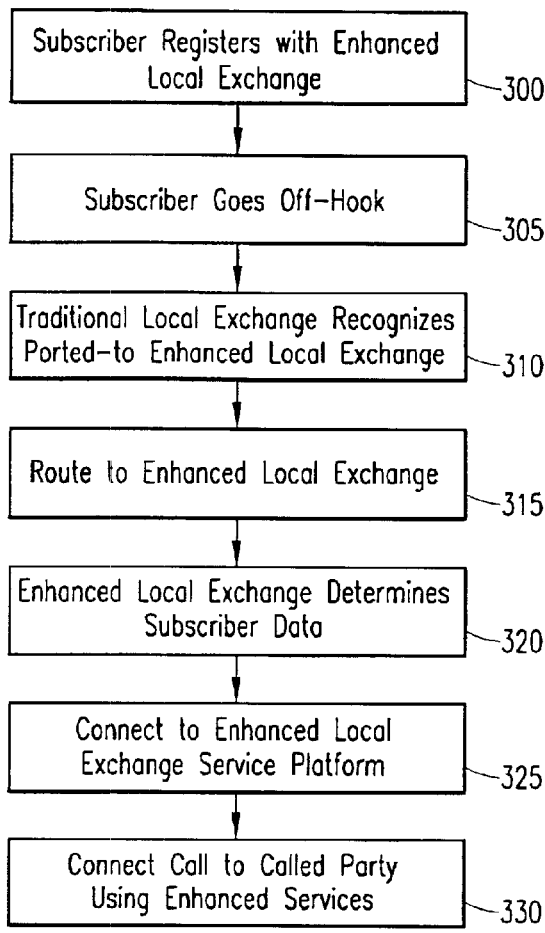
FIGS. 3A and 3B are simplified flow charts illustrating the steps for routing calls to and from a subscriber connected to the enhanced local exchange of FIG. 2.

With reference now to FIG. 3A of the drawings, which will be described in connection with FIG. 2 of the drawings, when a subscriber 150a registers with the ELE 130 (step 300), the subscriber's service is effectively transferred from a traditional local exchange 110 to the ELE 130, such that when the subscriber 150a picks up the telephone (step 305), the traditional local exchange 110 recognizes that the "port" the telephone is on is one associated with the ELE 130 (step 310). Typically, the traditional local exchange performs a database lookup, possibly via an SS7 link, to determine that the subscriber 150a has been transferred to the ELE 130.

This "trigger point" causes the traditional local exchange 110 to immediately route the connection to the ELE 130 either directly or through additional switch connection points via a Service Transfer Point (STP) 120 of the SS7 network (step 315). Thereafter, the ELE 130 captures routing information from the STP 120 to determine the subscriber 150a and retrieve subscriber data associated with the subscriber 150a (step 320). The ELE 130 then provides the equivalent of local "dial-tone" to the subscriber 150a, who can then place a call to a called subscriber 150b. If the subscriber 150a has subscribed to at least the virtual office phone (basic) service, the subscriber 150a can connect to the enhanced services platform 100 within the ELE 130 (step 325) to utilize the voice-activated interface throughout the call (step 330). Since the platform 100 is within the ELE 130, the platform 100 acts as if it is another adjunct point within the local PTN 102.

Figure 3B:
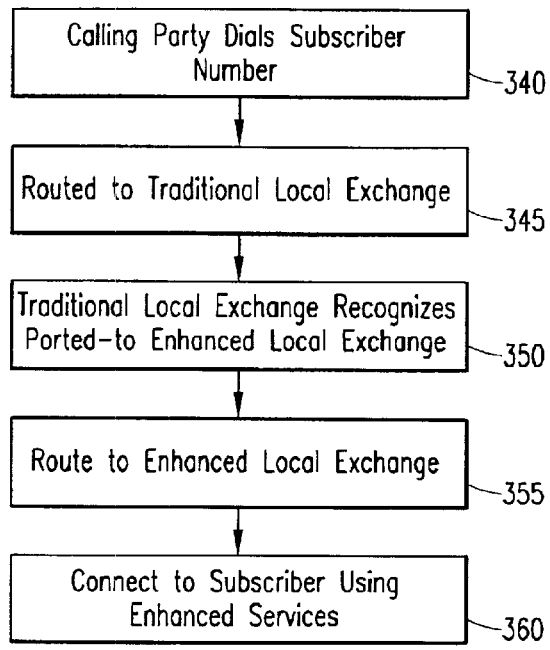

With reference now to FIG. 3B of the drawings, which will be described in connection with FIG. 2 of the drawings, the subscriber whose services are registered with the ELE 130 for purposes of FIG. 3B is subscriber 150b. Therefore, when a calling subscriber (here subscriber 150a) calls the subscriber number associated with the called subscriber 150b (step 340), the call is typically routed to the traditional local exchange 110 that used to service the called subscriber 150b (step 345). Once the traditional local exchange 110 realizes that the called subscriber's services have been transferred to the ELE 130 (step 350), the traditional local exchange 110 routes the call to the ELE 130 (step 355), which connects the call to the called subscriber 150b using the enhanced services platform 100 (step 360).

Figure 4:
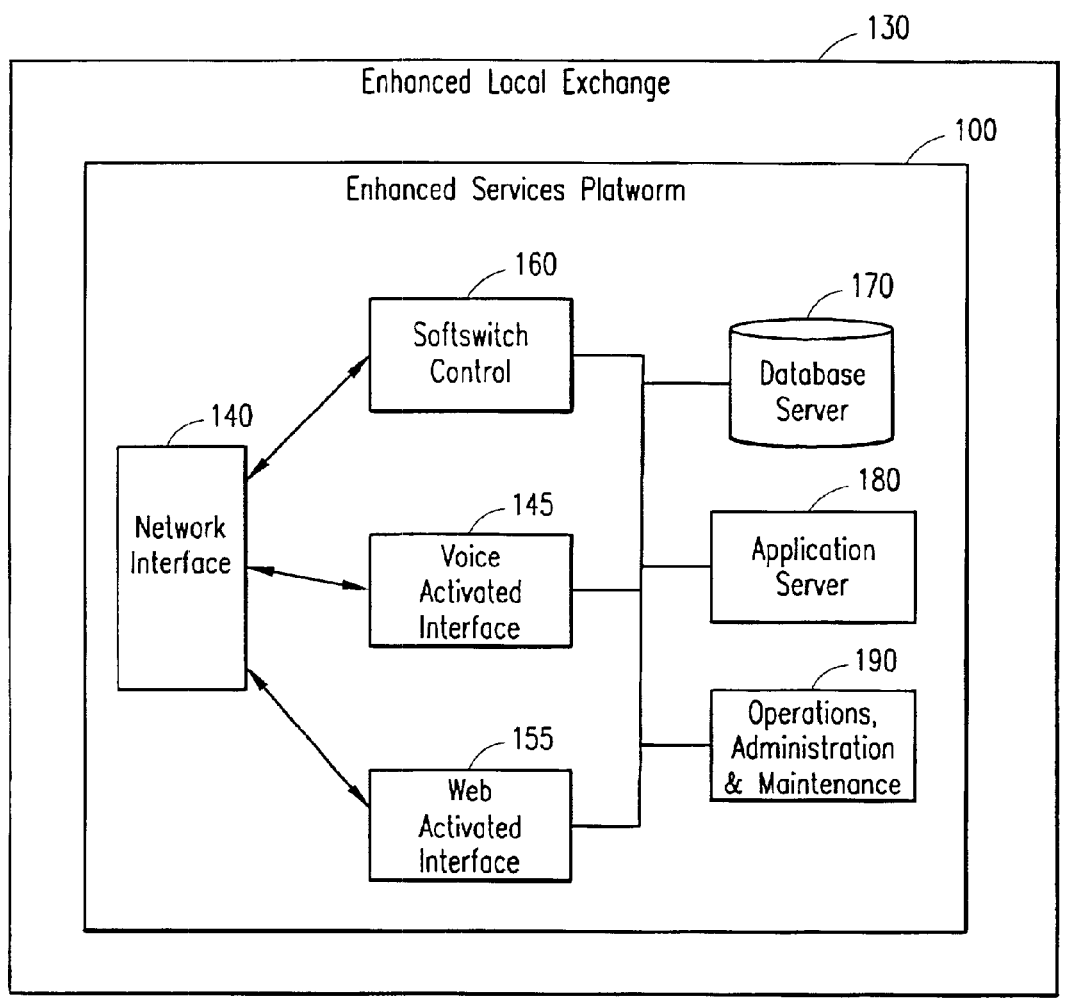
FIG. 4 illustrates in greater detail the components of the exemplary enhanced services platform within the enhanced local exchange of FIG. 2.

With reference now to FIG. 4 of the drawings, there is illustrated in greater detail the service platform 100 shown in FIG. 2. The service platform 100 of the ELE 130 includes a programmable network interface 140 operatively connected to at least one softswitch 160. The programmable network interface 140 is capable of being incorporated within and interfacing with the PTN 102. In addition, the programmable network interface 140 not only interfaces with the PTN, but can also interface with a variety of other types of communication networks (see FIG. 5). The programmable network interface 140 supports and/or provides some or all of the following capabilities: (1) standard network protocols: T1, E1, ISDN, SS7; (2) call progress analysis; (3) conferencing; (4) simple prompting; (5) reception of call data from network prior to and during call connection (ISDN); and (6) communication with the network without connection (SS7).

The softswitch 160 is capable of integrating and managing a plurality of enhanced telecommunications services contained within an applications server 180. In addition, the softswitch 160 is capable of using a voice-activated interface 145 to enable a subscriber to access at least one of the plurality of enhanced telecommunications services.

The softswitch(s) 160 is generally responsible for downloading firmware, prompts, system parameters, span parameters, channel parameters, ISDN parameters and SS7 parameters to the network interface 140. Upon startup, the softswitch(s) 160 typically determines what information needs to be downloaded and automatically performs the download. During normal operation, if there is a loss of configuration or a change in configuration, the softswitch(s) 160 can automatically reconfigure the programmable network interface 140. Reconfiguration of a channel usually waits until the channel is idle.

The softswitch(s) 160 also supports the hot swappable capabilities of the programmable network interface 140. This includes both adding capacity and replacing failed cards. Furthermore, the softswitch(s) 160 also communicates with a database server 170 to support changes in subscriber data. The softswitch(s) 160 requires up-to-date routing information to ensure proper handling of callers.

The softswitch(s) 160 further includes application software responsible for all aspects of inbound and outbound call processing, switch administration, monitoring, error logging, alarming, and CDR (Call Detail Records) generation. The call processing software of the softswitch(s) 160 is responsible for routing callers and subscribers calling the system to the voice-activated interface 145 for sign on and for providing state and status information to the voice-activated interface 145 upon connection. This allows the voice-activated interface 145 to perform the proper call flow for the given situation.

In addition, the call processing software within the softswitch 160 is responsible for routing both callers and subscribers based on information received from the voice-activated interface 145. For example, the information received from the voice-activated interface 145 may instruct the call processing software within the softswitch 160 to forward callers to a specific number or voice mail, route subscribers to voice mail to check messages (internal or external), place callers on hold, connect callers with subscribers, swap a caller on hold with caller involved in a current call with the subscriber, perform conferencing (e.g. create a "meet me" conference, conference subscribers with an administrative application within the applications server 180 to receive commands, conference callers with the subscriber or conference a call with a recording system within the applications server 180 to record the conversation of the call), locate a subscriber for a caller, make calls for a subscriber, forward callers to a number on the subscribers speed dial list, perform auto-redial functionality upon detection of busy if requested by the subscriber, disconnect callers or tear down conferences.

The voice-activated interface 145 is key in interacting with subscribers and their callers. The service platform 100 is able to "converse" with a caller similar to the way two people converse using the voice-activated interface 145. The voice-activated interface 145 provides simple and complex voice prompting and interaction with the database server 170. Furthermore, the voice-activated interface 145 provides a voice recognition functionality, which enables user interaction with the voice-activated interface 145. The voice recognition functionality can be either internal to the voice-activated interface 145 or can be an external resource. It should be noted that Dual Tone Multi-Frequency (DTMF) can be used wherever the caller desires instead of voice commands, such as to dial a telephone number not stored in the database 170.

The voice-activated interface 145 functions like a "communicator/translator" between the caller and the service platform 100, and this function is referred to herein as the "virtual administrator." The "conversations" with a subscriber and/or caller are as human as possible. Therefore, individual voice commands are able to be supplied with a rather extensive vocabulary, using simple sentences.

The voice-activated interface 145 preferably provides tutorials to the subscriber the first time the subscriber accesses the platform 100, or as needed. In addition, the voice-activated interface 145 provides an error-correcting mechanism, which supplies helpful error messages when a command is not understood. Furthermore, the voice-activated interface may provide two sets of prompts: one set for beginners and one set for advanced users. The prompts for beginners can be long and explanatory. The prompts for advanced users can be fairly concise. With advanced prompts, the error messages preferably contain additional information.

For each received voice command, the "virtual administrator" associated with the voice-activated interface 145 either acknowledges the command, requests additional information (e.g. in the case where there is ambiguity as to what the subscriber wants or if additional information is actually needed to perform the voice command) or rejects the command when the "virtual administrator" does not understand what was spoken. Rejection messages preferably list the valid options. If the "virtual administrator" times out without hearing any speech, the error message preferably helps the subscriber understand what to say in this context. Preferably, the subscriber is able to transmit a command to "wait a minute" to pause the "virtual administrator" and allow the subscriber time to look up information or do something else.

Furthermore, if the "virtual administrator" performs the wrong command or the subscriber speaks the wrong command, the subscriber preferably has the ability to back-up and provide the correct voice command. The subscriber should also preferably be able to request a list of valid commands. Recognition accuracy can be further improved by remembering the options the subscriber typically speaks and weighting the recognition results accordingly. For instance, the "virtual administrator" can remember which speed dials are used most often, what phone numbers are dialed manually most often, and which commands are executed most often. In the case of the speed dials, the candidates for forwarding may be different than candidates for calling.

The general system requirements of the voice-activated interface 145 are: (1) hardware independence, which allows transparent replacement of hardware components from various vendors; (2) scalability, which allows each node to handle between 24 and 512 ports, and allows for multiple nodes; (3) flexibility, which allows various applications to run on a single server or across multiple servers; (4) open interfaces that support open database (SQL) and call control APIs (TSAPI); and (5) a configuration database that has fast access times, provides persistence, and can be remotely accessed.

The voice-activated interface 145 generally requires the ANI/DNIS (Automatic Number Identification/Dialed Number Identification Service) for each call in order to perform the proper sign-on. In addition, the voice-activated interface 145 has knowledge of whether there are callers on hold when the subscriber signs-on and the current state any time the subscriber invokes the administration process of the service platform 100.

The voice-activated interface 145 also provides a "wake-up" function. The preferable way of receiving subscriber instructions is via voice commands. However, during a call session, there may be times where a subscriber is in a telephone call and does not need the complex communication functions of the service platform 100. In these cases, a voice recognition resource of the voice-activated interface 145 is available to understand a few simple commands (e.g. "Service platform, I need you") in order to connect the subscriber to the full functionality of the service platform 100.

The database server 180 provides all subscriber specific profile and routing information on an as needed basis to the softswitch 160. This information can include, for example, subscriber attributes, component attributes, rate table attributes, contact list attributes, schedule attributes, route option attributes, route list attributes, messaging attributes, paging attributes, usage attributes, caller ID history, future conferences and VIP exceptions.

The subscriber profile information can be entered, modified or deleted by the subscriber via the voice-activated interface 145 or via the web-activated interface 155. The web-activated interface 155 also provides access to subscriber billing information and account status. Besides servicing existing subscribers, the web-activated interface 155 is also capable of automatically creating new accounts for customers that want to sign up for services.

In preferred embodiments, the database server 180 is a scalable UNIX platform with support for a RAID disk array. The scalability is achieved by adding CPUs and memory, or by changing to faster CPUs. The CPUs and memory do not have to be hot swappable, because upgrades are preferably performed during a maintenance window. However, the RAID system should have hot swappable drives. The operations, administration and maintenance (OAM) server 190 uses a client/server type architecture. The client application(s) provide remote access to the system to perform OAM functions. The OAM 190 includes diagnostic tools that help service provider personnel diagnose and correct problems. One such tool is a monitoring tool, which allows personnel to view the states of resources on a system and to issue specific commands to a selected resource. For example, the monitoring tool may allow personnel to view the state of a channel and provide the ability to busy it out or release it. A tracing tool can be provided that allows real time state traces of selected resources and packet traces of data links. State traces show the current state, the input, and the next state for each state transition of a selected resource. Packet traces show each data packet transmitted and received on a data link in either binary or ASCII format. All traces are preferably time stamped.

The OAM 190 further includes an administration applications) that allows modifications to be made to both the system and to subscriber information. For example, an administration application may allow personnel to modify customer (subscriber) account and billing information. Another administration application may allow personnel to configure system parameters, such as span and channel parameters, timer values, and protocols to use. In addition, the softswitch(s) 160 can contain servers/agents that support remote access to the OAM server 190.

Maintenance functionality within the OAM server 190 includes database backups, standard database management, restoring ability and software upgrades. Where appropriate, standard tools such as telnet and ftp are used.

Figure 5:
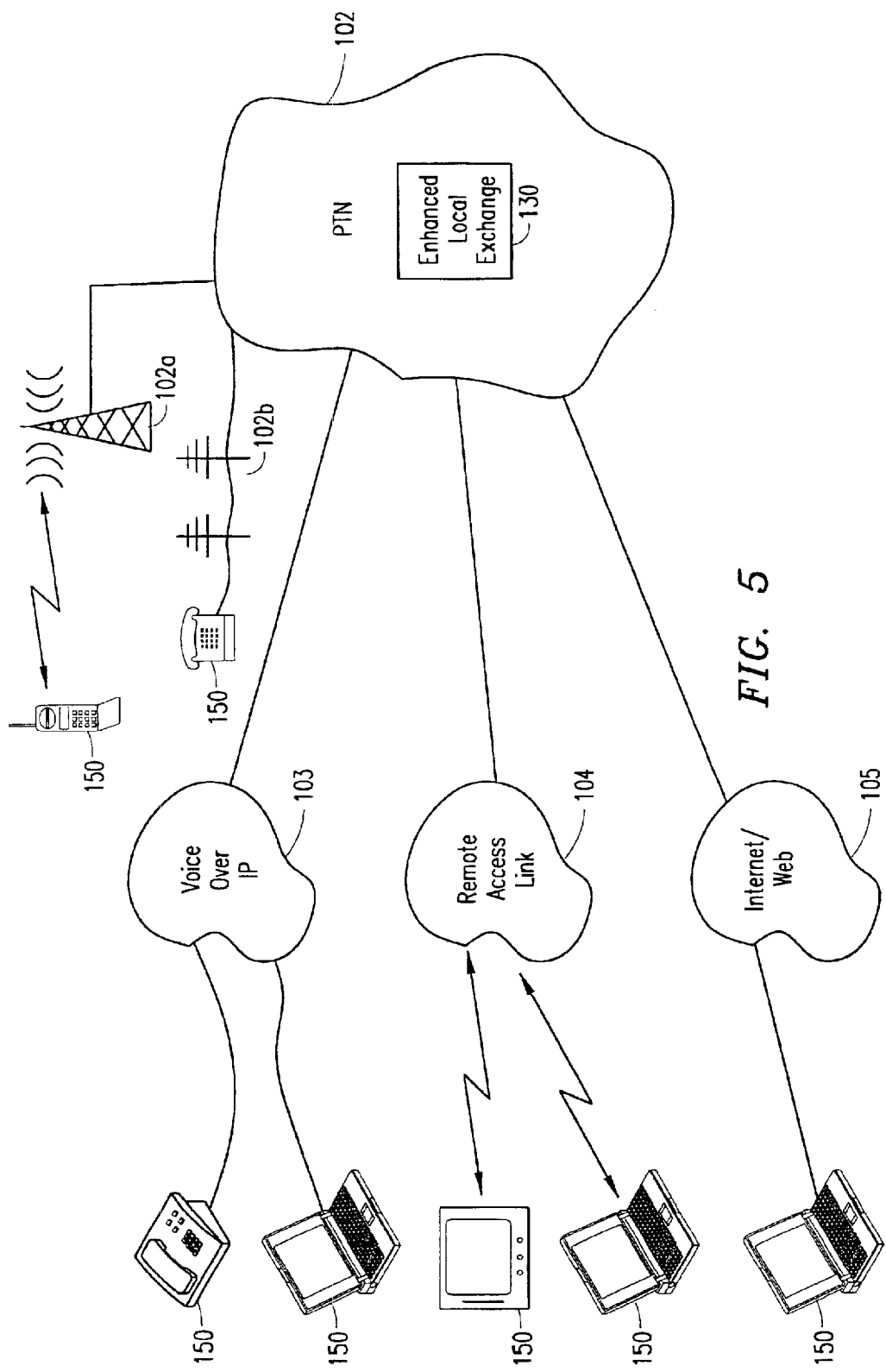
FIG. 5 illustrates in greater detail the various types of networks and subscriber equipment capable of connecting to the enhanced local exchange of FIG. 2.

With reference now to FIG. 5, there is illustrated a plurality of different networks 103–105 and subscriber equipment 150 that can interface with the ELE 130 via the PTN 102. For example, within the PTN 102, the subscriber can access the ELE 130 via a wireless phone 150 within the PLMN 102a or via a wireline phone 150 within the PSTN 102b.

As another example, the subscriber can connect to the ELE 130 via a voice over Internet Protocol (IP) network 103, using an IP phone or computer or other such device. As a further example, the subscriber can connect to the ELE 130 via a remote access link 104 using a Personal Digital Assistant (PDA) or computer. As a further example, the subscriber can connect to the ELE 130 via the Internet or World Wide Web (WEB) 105, using a computer or other device capable of connecting to the Internet/WEB 105.

Figure 6:
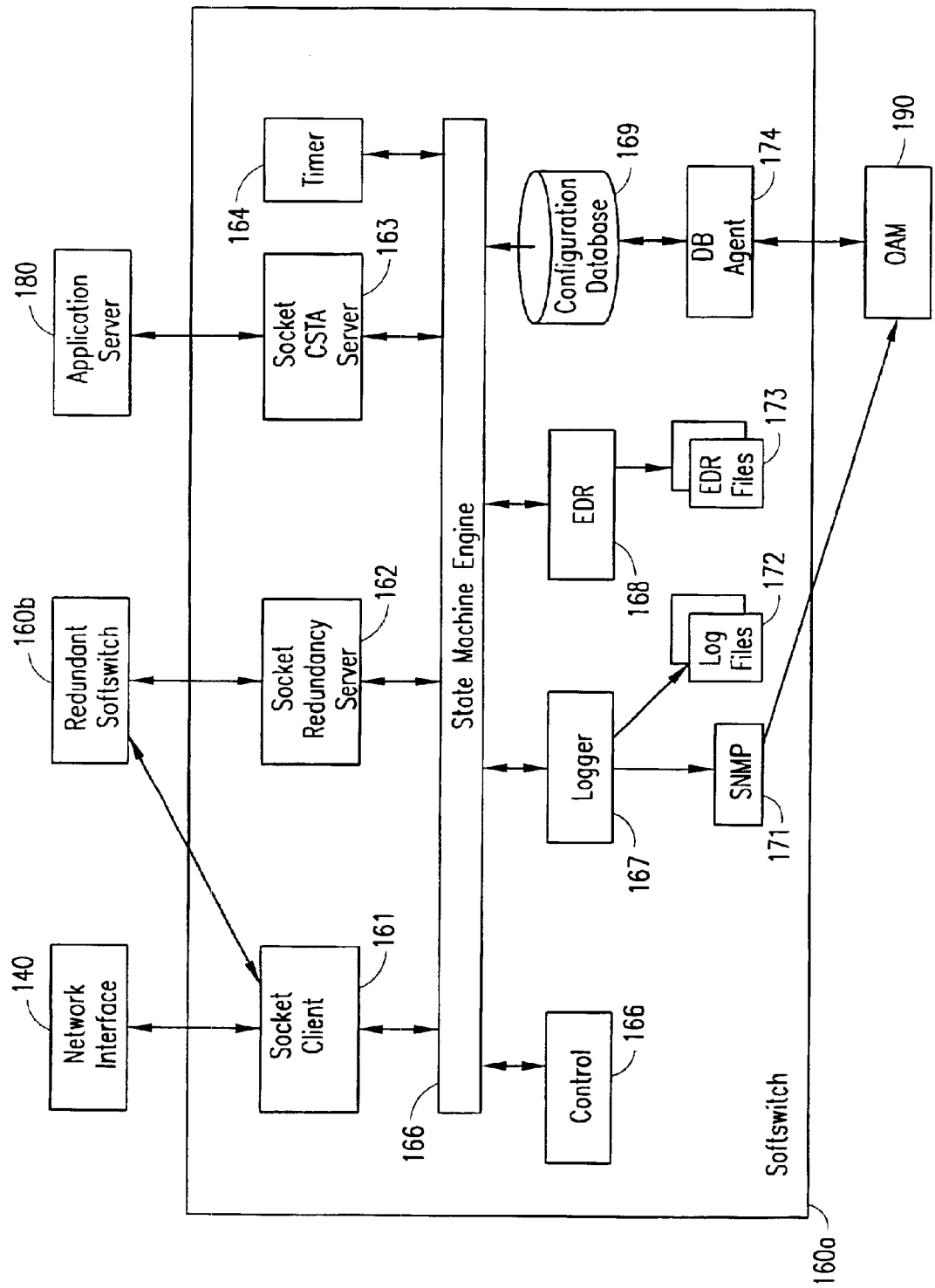
FIG. 6 illustrates in greater detail an exemplary architecture of a softswitch within the enhanced services platform of FIG. 4.

With reference now to FIG. 6 of the drawings, there is illustrated in greater detail an exemplary architecture of the softswitch 160 within the enhanced services platform 100 of FIG. 4. The softswitch 160 is a real time telephony application that facilitates protocol conversion, routing, conferencing, out dialing, forwarding, transferring and inbound call concentration to shared resources. The softswitch 160 is preferably developed on LynxOS, which is a UNIX-compatible, POSIX-conforming, multi-process, multithreaded operating system designed for complex real-time applications that require fast, deterministic response.

The softswitch 160 is designed to handle call processing for a multi-node configuration with up 30,000+ ports of traffic. The softswitch 160 is further designed with hot standby redundancy and provides significant OAM functionality. The software of the softswitch 160 consists of multiple event-driven processes and threads. The processes/threads operate asynchronously, driven through external events received from the network interface 140 and the applications server 180, and by internal timing events.

FIG. 6 is a representation of all of the components of the softswitch 160, their inter-process communication (IPC) and external interfaces. All components communicate with the logger 167, and have access to the configuration database 169, but the lines have been left out for clarity.

The socket client subsystem 161 consists of a multi-threaded process responsible for maintaining all softswitch socket communication with the network interface 140 and call processing redundancy to other softswitch(s) 160b. For client operation, the softswitch 160a must initiate the connection. The main thread (sender) is responsible for initialization and instantiation of the threads that perform the receiving. The main thread also receives all outbound socket data via the IPC and performs the writes to the appropriate socket. The receiving threads read the data from the socket and send it via IPC to the state machine engine 165 for processing by the appropriate state machine.

The socket Computer Supported Telecommunications Applications (CSTA) server subsystem 163 consists of a multi-threaded process responsible for maintaining all softswitch socket communication with the applications server 180. For sockets in which the softswitch acts as a server, a thread acts as a daemon listening for connect requests and spawns receiving threads for each request. The receiving threads read the data and send it to the state machine engine 165 for processing by the appropriate state machine. A sender thread receives all outbound socket data via IPC and performs the writes to the appropriate socket. Third party call control, routing and call data record (CDR) events are transmitted on these connections. For diagnostic purposes, each thread is also capable of logging raw data traces to the logger task if enabled.

The socket redundancy server 162 is the exact same process as the CSTA server 163, except that it listens on a different port number for connections. The redundancy server 162 listens for a redundancy connection from the redundancy softswitch 160b. The receive thread reads data and sends it to the redundancy state machine (not shown) within the redundancy softswitch 160b for processing. This link is primarily used for negotiating which softswitch (160a or 160b) is primary/secondary, and sending periodic "Keep Alive" messages to the other softswitch(s) 160a and 160b. If the secondary system notices a loss of connection to the primary system or if three consecutive "Keep Alive messages" are missed, it immediately becomes primary.

The state machine engine 165 receives all events for all resources. A resource is transitioned based on the current event, it's current state and it's state machine. During a transition, actions are performed that include execution functions, sending messages to other resources or tasks, setting and clearing timers and performing local stack operations. The engine 165 is also responsible for controlling dynamic provisioning of resources. Resources can only be provisioned in an IDLE state, so the engine 165 must flag requested provisioning changes and deliver them when the resource is IDLE. For diagnostic purposes, the engine 165 generates resource state traces to the logger 167 when they are enabled.

The control module 166 is responsible for initializing the system, starting all processes after boot up, and restarting or rebooting the system in the event that a process dies. A process may exit due do an unexpected problem or may exit because of a known situation. In either case, the control module 166 reboots the system, causing the hot standby redundant softswitch 160b to take control.

The timer module 164 facilitates the expiration of timers set by other modules. When a timer expires, the timer module 164 send a message requested by the associated module when the timer was set to the associated module. Timers are used heavily in state machines 165 while waiting on expected events. The expiration of a timer allows a state machine 165 to gracefully recover from an error condition.

The logger 167 receives errors and diagnostic trace messages from all other modules and writes them to a log file 172. The logger 167 maintains a configurable number of log files 172 of a fixed size to provide an appropriate amount of history. Each error message contains the softswitch name, time stamp, error number, process name, file name, line number and variable length information. Errors may also be classified by severity. If the severity of an error is critical, it can be propagated to the alarm management system (SNMP) 171.

The Event Detail Records (EDR) module 168 receives EDR messages from various state machines on specific transitions. These messages are actually CSTA events, and when the EDR module 168 receives them, they are written in binary form to a daily EDR file 173. The EDR files 173 are used for billing, capacity planning, and diagnostic purposes. Each file 173 includes fixed and variable data depending on the record type. The fixed part of the file 173 (the header) preferably includes a record type, timestamp, and data length, while the variable part of the file 173 depends upon the type of file 173. The EDR module 168 retains a configurable amount of days worth of EDR files 173. A new EDR file 173 is preferably started every night at midnight.

The DB Agent 174 is a multi-threaded socket application that provides secure connections for remote OAM servers (clients) 190. The DB Agent 174 includes a listening thread that spawns a separate communications thread for each client that logs in. Each client is verified with a user name and password, and after successful logon, is capable of accessing the softswitch configuration database 169. PAPI is the preferred client/server protocol used, which allows for creation, modification, deletion and querying of softswitch resource configuration data, and allows querying of real-time dynamic resource information such as current state of a channel.

The SNMP 171 provides a remote alarming capability for the softswitch error messages that are sent to the logger 167. These error messages are propagated via traps to the OAM server 190, which delivers them to the appropriate local or remote service provider clients. As also briefly mentioned above, the softswitch configuration database 169 is a proprietary shared memory database design for access speed. The configuration database 169 contains all of the parameters required to configure every component. It also contains internal routing tables, port groups, configurable state machine parameters and dynamic real-time data as well. The configuration database 169 supports both persistent and non-persistent attributes, multiple storage types, including stacks, link lists, balanced AVL trees, and heaps, multiple simultaneous access and numerous data types.

Figure 7A:
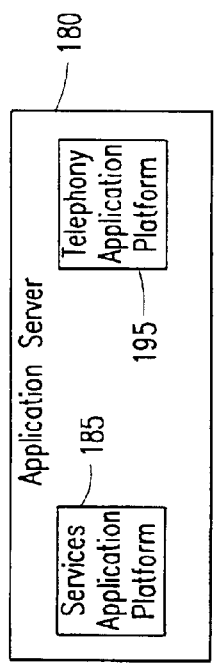
FIG. 7A illustrates in greater detail an exemplary architecture of an applications server within the enhanced services platform of FIG. 4.

With reference now to FIG. 7A, there is illustrated in greater detail the applications server 180 within the platform 100 of FIG. 4. The applications server 180 includes a services application platform 185 and a telephony application platform 195. The services application platform 185 provides services that do not require a telephony interface, whereas the telephony application platform 195 provides services that do require a telephony interface.

Figure 7B:
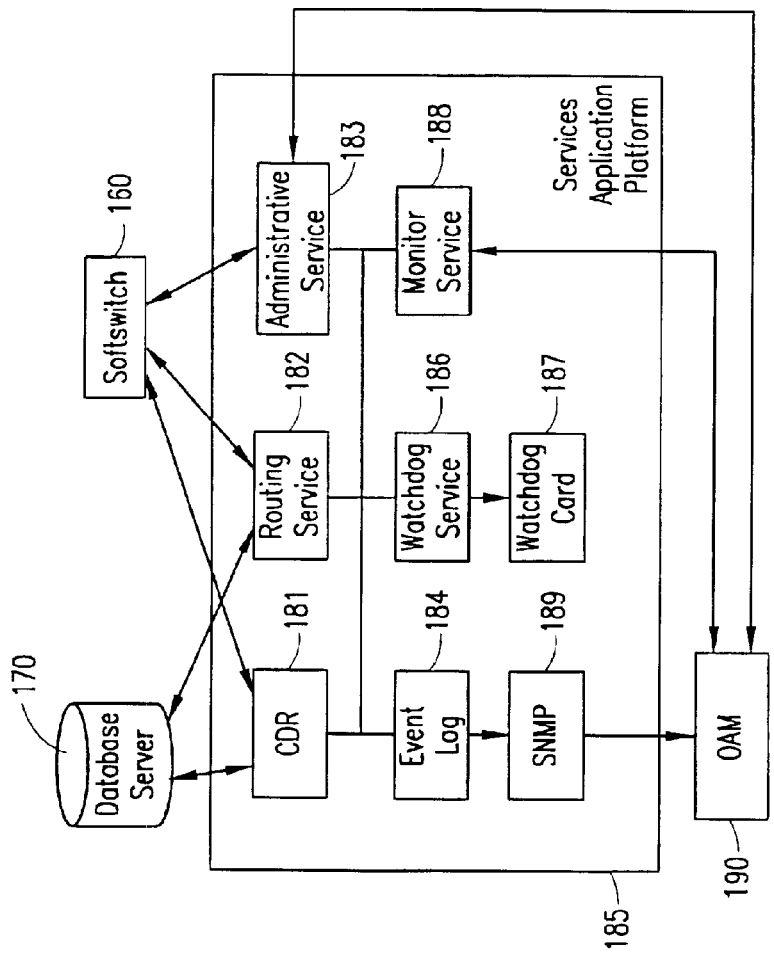
FIG. 7B illustrates in greater detail an exemplary architecture of a service applications platform within the applications server of FIG. 7A.

Referring now to FIG. 7B, the services application platform (SAP) 185 runs the following services: (1) routing service; (2) CDR service; (3) network interface administrative service; (4) watchdog service; (5) monitoring service; and (6) SNMP service. Since the SAP 185 provides services that do not require a telephony interface, these services interface only with the database server 170, softswitch 160 and OAM server 190 to facilitate a wide range of functionality. Each of these services is described in greater detail hereinbelow.

For the routing service, in order to facilitate the Single Number Access Service and future enhanced services, the softswitch 160 must be capable of obtaining call routing information from third party applications. Initially, this third party application is a Routing Server 182. The Routing Server 182 is responsible for making intelligent call routing decisions based on the service type and customer database 170 information.

At startup, the Routing Server 182, acting as a client, connects to the softswitch 160. Thereafter, this connection is maintained at all times. If the connection fails, the Routing Server 182 periodically attempts to reconnect to the softswitch 160. After the connection is established, the Routing Server 182 registers for each service on the softswitch 160 that it wants to control routing for. For each call that requires external routing, the softswitch sends a route request to the Routing Server 182. Based on the service type, the Routing Server 182 queries different customer database 170 tables to make the appropriate routing decision.

For the CDR service, at startup, a CDR Server 181, acting as a client, connects to the softswitch 160. Thereafter, this connection is maintained at all times. If the connection fails, the CDR Server 181 periodically attempts to reconnect to the softswitch 160.

Softswitch 160 provisioning, and configuration and maintenance on the softswitch 160 is performed via an Administrative Service 183. One or more clients can provision features of the softswitch 160 simultaneously using the Administrative Service 183 locally or remotely via the OAM 190. The Administrative Service 183 also communicates with the network interface 140 (shown in FIG. 4), which acts a proxy server for the Softswitch 160.

The SAP 185 is further equipped with a Watchdog Card 187 that has the ability to reset the CPU (not shown), and has a counter that automatically resets the CPU if it is not periodically updated. The purpose of the Watchdog Service 186 is to ensure that all SAP 185 services are operating properly, and if any service is not functioning, the Watchdog Card 187 automatically resets the CPU.

As each service on the SAP 185 starts up, it registers with the Watchdog Service 186, and sends periodic "Keep Alive" messages at the rate specified by the Watchdog Service 186. If a service fails to report N consecutive "Keep Alive" messages, the Watchdog card 187 resets the system. When the Watchdog card 187 resets the system, the Watchdog Service 186 notifies all registered services of the impending event. The Watchdog Service 186 also reports any missed "Keep Alive" messages or reset conditions to the Event Log 184.

The Monitoring Service 188 provides the ability to route diagnostic information to a remote client that has logged in and requested real-time information from an SAP 185 service. This Monitoring Service 188 provides secure logon in the form of user name and password from all clients, and allows multiple clients to log in simultaneously. Each SAP 185 application supports sending informational, trace, and diagnostic messages to the Monitoring Service 188. The Monitoring Service 188 is responsible for delivering those messages to the appropriate client.

Each SAP 185 also contains an SNMP Agent 189 that monitors the Event Log 184, and reports these events to the OAM server 190. The SNMP Agent 189 also monitors system disk, memory, and CPU utilization and reports alarms to the OAM 190 if usage exceeds a threshold.

Figure 7C:
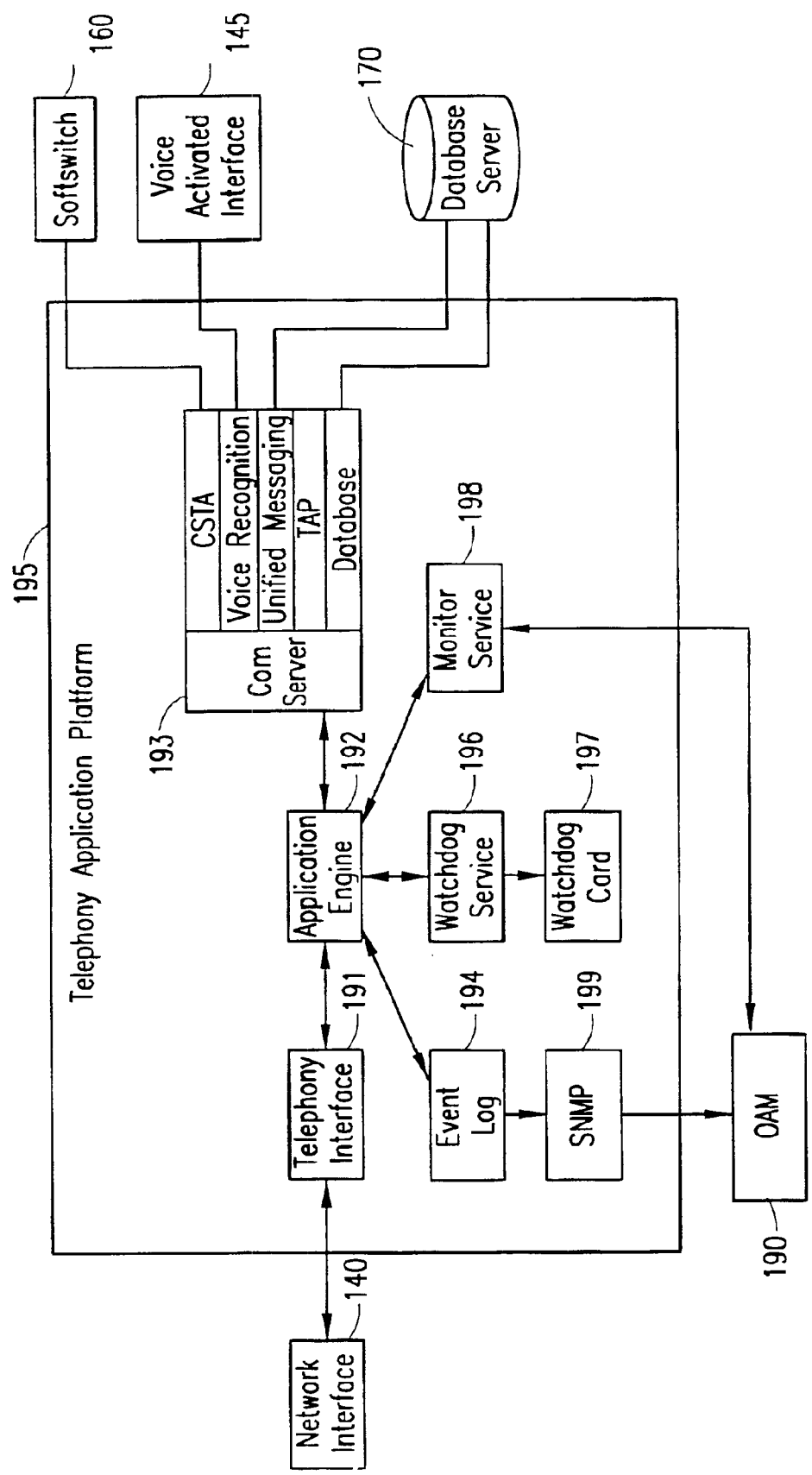
FIG. 7C illustrates in greater detail an exemplary architecture of a telephony applications platform within the applications server of FIG. 7A.

Referring now to FIG. 7C, the Telephony Applications Platform (TAP) 195 runs the following applications and services: (1) Application Engine; (2) Multi-Client COM Server; (3) Watchdog Service; (4) Monitoring Service; and (5) SNMP Service. Since the TAP provides applications that require a telephony interface 191, these applications interface with the subscriber database 170, softswitch 160, network interface 140, voice-activated interface 145 and OAM server 190 to facilitate a wide range of functionalities. Each of these services is explained in greater detail hereinbelow.

A standardized Application Engine 192 is required to perform processing of calls, requests, and other service operations. The Application Engine 192 is preferably a state machine responsible for processing calls and system events needed to facilitate enhanced services. These services include, but are not limited to, the following: (1) Tutorial; (2) Subscriber Account Management; (3) Single Number Access Service; (4) Virtual Administrator; (5) Virtual Office Phone; (6) Call Screening; (7) Voice Messaging; and (8) Unified Messaging. In addition, other maintenance items, such as subscriber verification, subscriber sign-on and subscriber setup are also supported by the Application Engine 192.

The COM server 192 is a multithreaded I/O server. It currently supports five different classes of I/O: (1) TAP to TAP communication; (2) Voice Recognition communication; (3) Unified Messaging communication; (4) Database communication; and (5) CSTA communication. Additional classes of I/O can be easily integrated into the COM server 192.

Applications on the TAP 195 initiate a connection the COM server 193 listening thread, which spawns a send/receive thread dedicated to that connection. Each send/receive thread forwards all requests via IPC to the COM server 193 main thread. The COM server 193 main thread then forwards the request to the appropriate I/O thread. When a response comes back, the I/O thread forwards the response to the COM server 193 main thread and then to the requesting send/receive thread.

The TAP 195 is also equipped with a Watchdog Card 197 that has the ability to reset the CPU, and has a counter that automatically resets the CPU if it is not periodically updated. The purpose of the Watchdog Service 196, as in the case of the SAP 185, is to ensure that TAP applications are operating properly, and if not functioning, the Watchdog card 197 automatically resets the CPU. The Watchdog Service 196 also reports any missed "Keep Alive" messages or reset conditions to the Event Log 194.

The Monitoring Service 198, as in the case of the SAP 185, provides the ability to route diagnostic information to a remote client that has logged in and requested real-time information from a TAP application. This service provides secure logon in the form of user name and password from all clients, and allows multiple clients to log in simultaneously.

Each TAP 195 also contains an SNMP Agent 199 that monitors the Event Log 194 and reports these events to the OAM server 190. The SNMP Agent 199 also monitors system disk, memory, and CPU utilization and report alarms to the OAM 190 if usage exceeds a threshold.

Figure 8A:
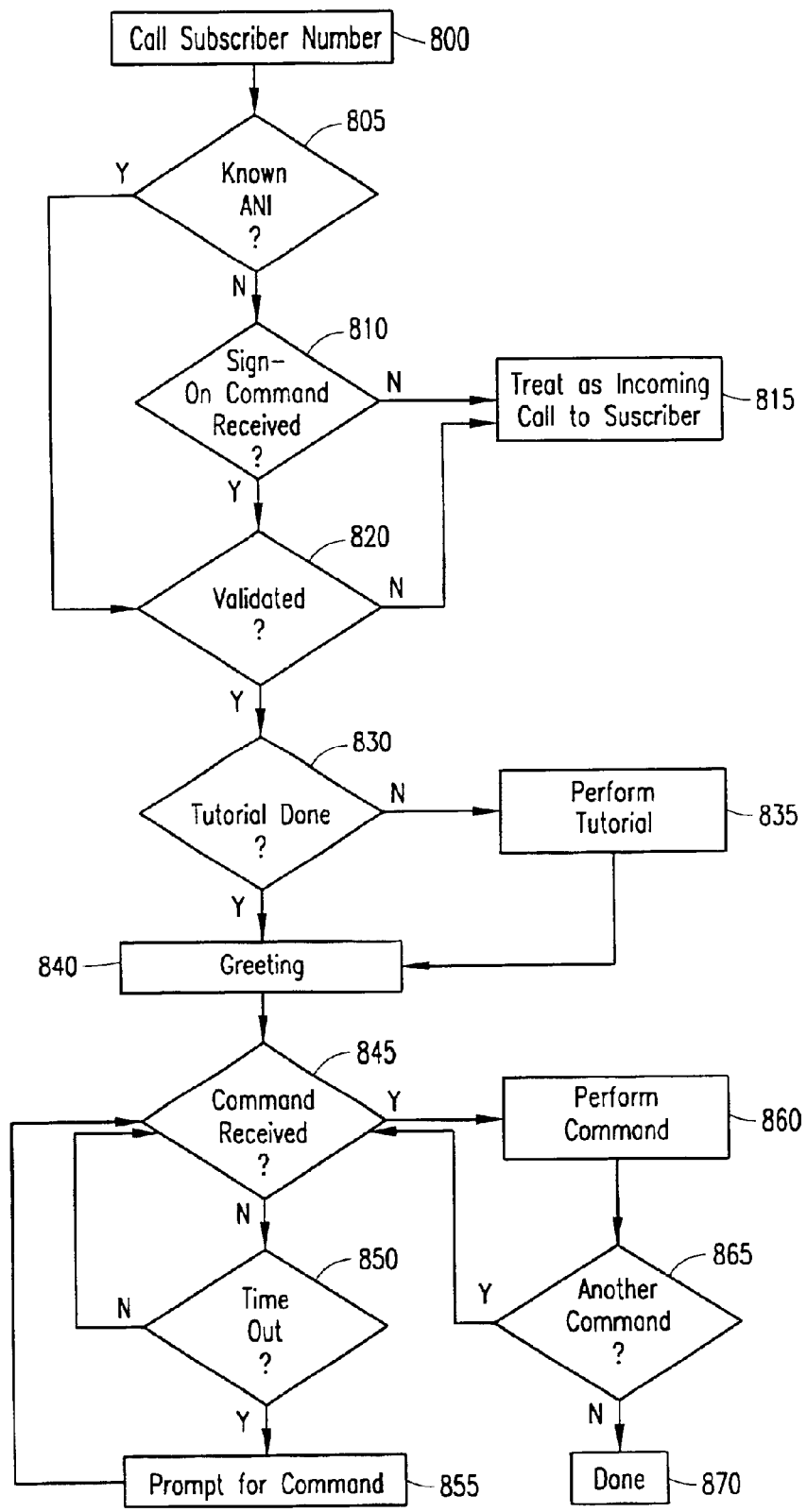
FIG. 8A is a simplified flow chart illustrating the steps for using the voice-activated interface of FIG. 4 to access one or more enhanced services.

With reference now to FIG. 8A of the drawings, there is illustrated the steps for using the voice activated interface of FIG. 4 to access one or more enhanced services. Subscribers who register with the enhanced local exchange of FIG. 4 are provided a personal local dialable telephone number and optionally an 800 number associated with the local number. Subscribers are able to call into the enhanced local exchange via their local and/or toll-free telephone number. Callers use the same numbers to contact the subscriber, so both Dialed Number Identification Service (DNIS) and Automatic Number Identification (ANI) from the PSTN must be used to identify the call as originating from the subscriber. ANI, when available, provides the caller's location.

When the subscriber dials his/her local or toll-free telephone number (step 800), the call is routed to the enhanced services platform within the enhanced local exchange (as described above in connection with FIG. 3). If the subscriber dials his/her number from a location that is not one of his/her known ANIs (step 805), the enhanced services platform initially assumes that the caller is not the subscriber. Therefore, during the initial greeting, the voice-activated interface of the platform is listening for a voice command to transfer the call to a subscriber sign-on process (step 810). If the voice-activated interface does not receive a sign-on command, the call is treated as an incoming call to the subscriber (step 815).

If the caller initiates the sign-on process or if the ANI identifies the caller as the subscriber (based on the subscriber profile stored in the database, which is accessed by the softswitch of the platform upon receiving the ANI), the "virtual administrator" of the voice-activated interface greets the subscriber and asks for further validation. Subscriber sign-on for validation is performed via spoken commands, possibly using speech print technology. Once the subscriber is validated (step 820), he/she has access to system features based on the subscriber profile (step 825). If the subscriber is not validated (e.g. in the case where another person is using one of the subscriber's phones and attempting to reach the subscriber), the platform treats the call as an incoming call to the subscriber (step 815).

As mentioned previously, when the platform receives the call, the softswitch accesses the database server to retrieve the subscriber profile information associated with the called subscriber. The subscriber profile is generated from a subscriber database that includes elements of the components he/she is utilizing. These elements include various general information, such as the subscriber account number, accounting information (for billing, usage, etc.), personal identifying information (for validation purposes), current schedules and routing options, usage statistics for prompting and tutoring levels, caller ID history of previous callers and other general information. In addition, the elements may include various features available to the subscriber, such as a contact list, including at least calling party names and one or more telephone numbers (ANI's) for each name, greetings (generic and/or specific based on the calling party), messaging attributes (voice, email, SMS), paging attributes and fax attributes.

Once the subscriber is validated (step 820), if it is the first time that the subscriber has signed-on to the platform (step 830), he/she is preferably required to go through a tutorial that guides them through initial configuration of their profile and provides them with general instructions on how to effectively use their "virtual administrator" (step 835).

After the tutorial is completed (step 835) or if the subscriber has previously signed-on to the platform (step 830), the session begins by the "virtual administrator" greeting the subscriber (step 840) and prompting the subscriber to supply a voice command (step 845). If the subscriber does not supply a voice command within a certain time period (e.g. the subscriber times out) (step 850), the "virtual administrator" prompts the subscriber again for a command, and possibly lists options available to the subscriber to help the subscriber determine the appropriate command (step 855). Once a voice command is received, the voice-activated interface and softswitch interact with the database server to carry out the command (step 860). Thereafter, the "virtual administrator" responds to the subscriber with confirmations and requests further commands (step 865). If no new commands are received and/or if the subscriber disconnects from the platform, the session is completed (step 870).

The voice commands allow the subscriber in session to perform most of the dialing and call completion functions associated with a phone system, such as dialing, call holding, call conferencing, call forwarding, etc., without requiring the subscriber to dial DTMF tones. This enables the subscriber to remain hands-free during the session.

For example, the subscriber is able to speak the telephone number that he/she wishes to call, speak pre-programmed speed dial numbers accessible via voice commands by name and location (e.g. call Bob at home) and request directory numbers for specific areas (e.g. call information in Seattle). In addition, the subscriber is able to place multiple calls without hanging up. For example, after the subscriber has finished with one call, the subscriber can say, "Now call Sue." Furthermore, the subscriber has the ability to request the platform to keep trying a busy telephone number without subscriber supervision (a feature termed automatic unsupervised redial). Once the number is no longer busy, the platform finds the subscriber and completes the call. Likewise, the subscriber has the ability to request the platform to connect him/her to the previous caller, or to a caller who left the subscriber a voice mail.

Other call functions that can be performed during a call with speech are call waiting (e.g. instead of a beep, the "virtual administrator" can say: "Incoming call from Mary. Do you wish to answer?"), call transfer (e.g. instead of dialing the transfer-to number, the subscriber can say: "Transfer to Frank" or "Transfer to voice mail"), call swapping (e.g. switch between a caller on hold and the current caller), call disconnect (e.g. instead of hanging up, the subscriber can say, "Hang-up"), call forwarding (e.g. the subscriber can request that an incoming call that the subscriber does not wish to answer during a current call be forwarded to a different number or voice mail) and conference calling on demand (e.g. the subscriber can say, "Conference in Joe and Bill with this call").

For call transfer, the subscriber preferably is able to listen to the call progress and talk to whomever answers the call before completing the transfer. If the number is not answered or is busy, then the subscriber can request another transfer or perform any of the other options available. Likewise, for call forwarding, prior to forwarding, a subscriber can record a short informational message to be played to the caller. Additionally, if the subscriber forwards the call to another number, a canned message can be played to the recipient of the call specifying the subscriber's name and the caller's name, if known.

For call waiting, while in a call session, a subscriber can be notified of another call waiting. The subscriber can take the call or ignore it. If he/she ignores it, the caller is routed to voice mail after a certain timeout. If the subscriber acknowledges the call by "waking up" the platform, the "virtual administrator" notifies the subscriber who is calling (recorded name of caller), and the subscriber has several options of how to route the call. The subscriber can either send the call through, conference the caller with the current call, ask the caller to hold, route the call to another number, take a message or give a specific message to the caller (i.e.—"John, I'll call you back in a few minutes."). If the caller has already been forwarded to voice mail when the subscriber finally acknowledges the incoming call, the subscriber may choose to listen to the caller recording the message, and then decide to connect to the caller. The subscriber also has the option of disabling call waiting. Call waiting is preferably automatically disabled during recording or conferencing.

For conference calling, the subscriber can either initiate a call (via voice dialing) to each party involved in the conference or an incoming caller can be conferenced with the subscriber and the current caller (e.g. "Meet-me conference"). Furthermore, a subscriber is allowed to set up "Meet-me Conferences" in advance or on the fly. To prearrange a conference, the subscriber can enter a conference ID of their choosing and the date and time of the conference. Subscribers must provide callers with the conference ID in advance. Alternatively, the subscriber can provide the ANI of parties involved in the conference, and when the ANI of the calling subscriber matches one of the conference parties, an announcement is played to the calling subscriber requesting him/her to join the conference. If the subscriber disconnects from a conference, the conference can optionally continue if the subscriber has that feature enabled. Furthermore, a subscriber can detach from a conference to make calls, check messages or perform any other enhanced service, and then later rejoin. Also, preferably, if a subscriber is in session and the scheduled time for a "Meet-me conference" has arrived, a reminder is played to the subscriber.

It should be understood that if the subscriber specifies another subscriber's enhanced local or 800 number using any of the above methods, then the platform uses the routing options of the second subscriber to locate him/her. It should further be noted that subscribers also have the ability to add names and locations of contacts to their speed dial (contact) list during a session if a name requested does not match a current entry.

Another enhanced service available to subscribers during a call is the ability to record a conversation at will, with some form of "tagging" of the call session for later retrieval. This recording service utilizes recording and playback technology that allows for a significant amount of voice storage and easy look-up functions (not voice store and forward). The recording service can also be activated for all calls, if desired, or for certain calls. The recording service can be activated prior to initiating a call or during a call, and can be discontinued at any time during the call.

Access to playback of recorded calls can be through the web-based interface via the Internet and/or through voice commands. Playback commands consist of at least: Delete, Pause, Fast Forward, and Rewind. Furthermore, the platform has the ability to supply a copy of a recorded conversation to a subscriber through various media, including audiotape, a WAV file via Internet or disk, or even a transcription. The platform is also capable of storing other forms of media in the database server where appropriate. For example, storage of faxes, e-mail, and/or video (from a video conferencing feature) is possible.

In addition to call completion functions, the subscriber also has the option of performing administrative functions to update their subscriber profile. As with call completion functions, all subscriber responses for administrative functions are via voice commands. Therefore, the voice-activated interface utilizes voice recognition technology to understand the subscriber's requests. Furthermore, the interfaces's prompting is also in a "conversational" format.

Administrative functions can be general maintenance functions, such as security functions, recording of greetings to specific callers or recording of a generic greeting, updating accounting data (billing address) or changing the feature packages that the subscriber is registered for. Other administrative functions include customer service needs, such as problem reporting, service questions and other requests.

The administrative functions can also include call routing functions, such as establishing or updating call routing access numbers of the subscriber (work phone, cell phone, home phone, pager and/or other appropriate routing locations) and associated times/days of week for routing to each of the access numbers if the subscriber subscribes to the single number access service. Other call routing functions include VIP exceptions, which provide special call handling for a specific caller based on the ANI, override call routing, which activates an alternate routing option where all callers are routed until the override is deactivated, specific caller routings, which is usually stored in the contact list and provides special routing instructions for specific callers (i.e.—take a message, play specific greeting, etc.), extended absence, which allows the subscriber to set up the start and end days for holidays and vacation periods where callers are routed to voice mail and turning on or off various routing options (i.e. voice mail, paging, etc.).

Part of the subscriber's profile in the database also includes a caller ID history buffer. This circular buffer contains the last N entries of all calls to the subscriber's enhanced telephone number. A buffer entry contains the number, time stamp and the ANI. If the ANI is in the subscribers speed dial (contact) list, the caller is preferably identified by name, otherwise the number is given. During a session, a subscriber may request a playback of the information in the buffer. After playback of each entry, the subscriber may request that the platform connect him/her to that caller. Additionally, the subscriber can simply listen to all entries, restart playback, quit playback, repeat an entry or request that the buffer be cleared. In preferred embodiments, after sign-on, subscribers are given an option to review their caller ID history if it is an enabled feature.

In addition to the recording service, the platform can also offer a unified messaging service. The messaging service provides unified messaging support for voice, fax, and e-mail. The unified messaging service is a central repository for subscribers' e-mail, faxes and voice messages. After subscribers sign-on, if there are any messages waiting in their mail box, they are notified of the number and types of messages and given an opportunity to listen to them.

E-mail, internally between groups of subscribers and externally via the Internet, is also available through the unified messaging service. The subscriber can be read back e-mail messages over a phone line using text-to-speech, view e-mail with other messaging sources (voice, fax or on a computer via the Internet), and send and receive e-mail with other subscribers or through the Internet. E-mail may also be forwarded or replied to in the usual method or with a voice attachment.

In addition, voice mail messages can be forwarded to another voice mail box, fax machine, e-mail address or any other communications device. Voice mail messages can be played back on a computer through an interface with the subscriber's e-mail address. The subscriber can also reply to the voice mail via e-mail if the caller's e-mail address is known (the caller's e-mail address can be stored in the contact list in the subscriber profile and included with the voice mail message sent to the subscriber's e-mail address) If the subscriber has a message, in addition to notifying the subscriber when the subscriber signs-on, the subscriber can request the platform to notify the subscriber using the Short Message Service (SMS) system or by paging the subscriber.

Furthermore, the subscriber can receive faxed messages into their voice mail box or into their e-mail address. Received faxed messages can be retrieved via e-mail through the Internet, by phone using text-to-speech or through a fax machine designated by the subscriber. Likewise, the subscriber can send a fax via e-mail or fax machine to the platform, which can forward the fax to the appropriate parties. If the subscriber sends the fax to another enhanced subscriber, the subscriber may have the option of attaching a voice message to the fax.

Reference is now made to Tables 1–4 below for a more complete listing of the enhanced services offered by the enhanced services platform.

TABLE 1

"Virtual Administrator" Features

| Feature | Description |
| --- | --- |
| Call Waiting | Inform the subscriber of a second incoming call. |
| Supervised Transfer | Transfer a call while listening to the call progress. |
| Forwarding | Automatically send incoming calls or callers on hold to a specified destination. |
| Call Swapping | Switch between a caller on hold and the current caller. |
| Call Disconnect | Subscriber can request the virtual administrator to disconnect a caller at any time during a call. |
| Sequential Calling | Make multiple calls through the virtual administrator without hanging up. |
| Conference on Demand | Conference in two callers. |
| Voice Dialing by Number | Ability to speak the telephone number to be called. |
| DTMF Dialing | Standard DTMF dialing is allowed. |
| Unsupervised Redial | Ability to keep trying a busy telephone number without subscriber supervision; once the number is no longer busy, the virtual administrator finds the subscriber and completes the call. |
| Dial Last Caller | Contact the last caller to whom you were speaking. |
| Call Screening | If the virtual administrator does not know the caller based on the ANI, it prompts the caller for his name. Subscribers can be notified of who is calling. |
| Auto Forward to Unified Messaging Service (UM) if Busy | If subscriber is already talking to two callers, send new callers to voice mail. |
| Message Notification of UM Messages | Subscribers can be informed of the type and number of messages in their box when they call into the virtual administrator. |
| Connect to Caller in UM Voice Mail | Give subscriber the ability to connect to a caller who is leaving a voice mail. |
| Voice Dialing by Name/Location | Ability to speak the name and location of a contact to initiate a call. |
| Meet Me Conference | Up to 8 callers can join a subscriber in a pre-arranged conference |
| Caller ID History | A circular buffer stores the last N entries of all calls to the subscriber's enhanced number. This information includes the number, time stamp, and the ANI. |
| External Voice Mail Support | Ability to transfer callers to external mail systems. |

TABLE 2

Single Number Access Service Features

| Feature | Description |
| --- | --- |
| Hard Forward | Ability to hard forward to an override number. |
| ANI-based Routing | Ability to route callers differently, depending on whether they are in the subscriber's contact list. |
| Exception/VIP Routing | Allows the subscriber to designate one caller (ANI) for special handling, if the subscriber is in session. The VIP can be hard forwarded to a designated number or the subscriber can be interrupted with a special call waiting indication (unless recording is activated). |

TABLE 2-continued

Single Number Access Service Features

| Feature | Description |
|---|---|
| Extended Absence | A start and end day for holiday and vacation periods when callers are routed to voice mail. |
| Contact List | The names and phone numbers of family, friends, and colleagues. |
| Route Lists | Specifies the sequence of Route Options and whether calling should be in sequential or broadcast mode. |
| Schedules | Specifies time of day, days of week and the route list to use. |
| Sequential Search | Dial the numbers in a subscriber's Route List one at a time to locate them. |
| Broadcast Search | Dial the numbers in a subscriber's Route List simultaneously to locate them. |
| Route Options | Route options include mobile, office, home, pager, voice mail, and 3 alternatives. |
| Paging | Page to notify subscribers of a waiting caller using:<br>Numeric/Alpha<br>E-mail<br>Data Link (TNPP TAP/PET paging protocols) |

TABLE 3

Unified Messaging Service Features

| Type | Feature | Description |
|---|---|---|
| Voice | Forwarding<br>Reply<br>Callback<br>Internet Retrieval<br>Phone Retrieval<br>Networking (VPIM) | The platform provides a voice mail feature to record caller messages. Voice mail is completely accessible via both voice commands and the Internet. The system allows for re-trieval of messages, along with the ability to forward and reply to messages. The platform allows integration to an external Voice Mail system via VPIM, so that messages received by the platform can be forwarded to the appropriate location in the client voice mail system. |
| E-mail | Forwarding<br>Reply<br>Internet Retrieval<br>Phone Retrieval | E-mail is available internally between groups of subscribers and externally via the Internet. Subscribers can hear their E-mail via text-to-speech, view E-mail with other messaging sources (such as voice or fax) on a computer via the Internet, and send and receive E-mail with other subscribers or through Internet interaction. E-mail may be forwarded or replied to in the usual method or with a voice attachment. |
| FAX | Internet Retrieval<br>Voice Attachment<br>Store and Forward | Callers can leave a Fax message in the subscriber's mailbox with or without a voice attachment. Sub-scribers can retrieve their Faxes over the Internet or by entering a desti-nation number. Additionally, the Fax can be converted to an E-mail and delivered to an E-mail address. |
| Message Notifica-tion | Short Message Service (SMS)<br>Paging<br>Voice (when in system)<br>Message Forwarding | Notification of messages is through typical as well as unique methods. For example, calling your current routing location, notifying a pager, using SMS, sending a message to your E-mail address, or notifying a subscriber that is in a call session. |
| News | News Service | |

TABLE 4

Recording Service Features

| Options | Feature | Description |
|---|---|---|
| Recording | Recording on Demand<br>Record All Calls | Ability to record a conversation at will while a call is in progress.<br>Ability to record all incoming calls based on DNIS or account number. |
| Playback | Phone/Internet<br>Delete<br>Pause<br>Fast Forward<br>Rewind | Storage of recorded calls is time-limited. Access to playback of recorded calls is through Internet and/or voice commands. Playback commands consist of Delete, Pause, Fast Forward, and Rewind. The platform can supply a copy of a recorded conversation to a subscriber through various media, including audiotape, a WAV file via Internet or disk, or even possibly a transcription. |

Figure 8B:
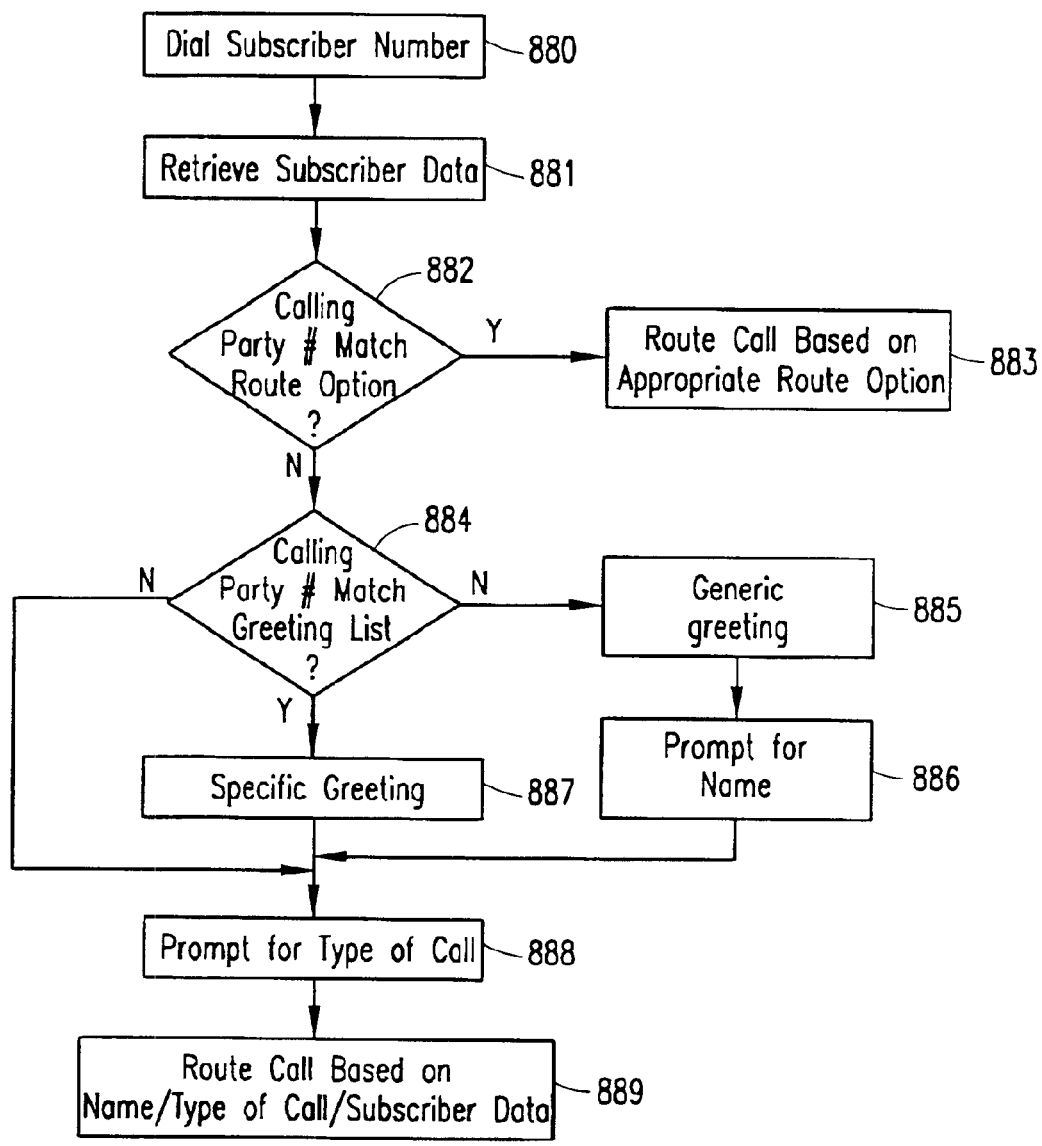
FIG. 8B is a simplified flow chart illustrating the steps performed by the enhanced service platform of FIG. 4 when an incoming call to a subscriber registered with the enhanced local exchange is received.

With reference now to FIG. 8B, there is illustrated the steps performed by the enhanced services platform of FIG. 4 when an incoming call to a subscriber registered with the enhanced local exchange is received. When an incoming call to a subscriber registered with the enhanced local exchange of FIG. 4 is received by the enhanced services platform (step 880), the platform retrieves, if available, caller information, such as ANI (Automatic Number Identification) and DNIS (Dialed Number Identification Service). Thereafter, the platform retrieves the appropriate subscriber profile information from the database server (step 881).

The platform then compares the ANI with subscriber routing instructions stored in the subscriber profile to determine the initial routing requirements. For example, the subscriber may have set his/her contact list such that all calls from a particular ANI are automatically routed to the subscriber's voice mail, fax machine, e-mail address, home phone, pager, cell phone or work phone. If the ANI is within the contact list and has specific routing instructions associated with it (step 882), the platform routes the call using the associated routing instructions (step 883). The voice-activated interface may also play an announcement to the calling party during the routing process (e.g. "Please wait while I transfer your call").

If the ANI does not have any specific routing instructions associated with it, the platform determines if the ANI has a specific greeting associated therewith in the contact list. If so, a caller specific greeting is played. If not, and the subscriber has a call-screening feature enabled, the caller is met with a generic greeting and prompted for their name. Otherwise, the caller is prompted for the type of call (voice, fax, e-mail, voice mail, etc.) (step 888). For example, callers to subscribers may send a fax to the subscriber through the single access number. Once received, the fax is stored in the database server. The subscriber may then call into the platform to access the fax similar to voice messages (unified messaging). Faxes can be sent and/or accessed through a local fax machine, Internet fax capability, speech-to-text or e-mail conversion.

Thereafter, the call is routed based on the type of call, name (if provided) and call routing features established by the subscriber (step 889). The platform interacts with the database server to determine the correct routing instructions for the call. For example, if the subscriber has a "Meet-Me" conference active, then callers are prompted to join. If the caller is not invited to the conference and/or does not know the conference ID, the caller is forwarded to the subscribers voice mail.

As another example, since the platform is accessible (for configuration changes, scheduling, e-mail, etc.) via the web-activated interface, the platform has knowledge of when a subscriber is in a web session, and can make appropriate decisions with callers based on that knowledge. For example, the platform may be able to enable the subscriber to interact with the caller through the web interface using voice over IP.

As a further example, if the subscriber has the override feature active, the caller is forwarded to the override number. As a further example, if the subscriber has activated the extended absence service, the caller is routed to voice mail. Likewise, if the caller is involved in a session where both lines are busy, the caller is forwarded to voice mail. However, if the subscriber has a VIP exception for the caller, the caller is handled in a special way designated by the subscriber. The VIP can be hard forwarded to a designated number or the subscriber can be interrupted with a special call waiting indication (unless the recording service is activated).

If the subscriber has the single number access service, routing of calls may also depend on the time of day, days of week and one or more routing lists. Routing lists specify the sequence of route options (home first, then cell phone, then voice mail, etc.) and whether calling should be in sequential or broadcast mode. Routing lists include the various terminating devices (subscriber equipment) that the subscriber can be reached at, along with paging and voice mail options. Each option may also specify how many rings to allow at that device. While the subscriber is being located, the caller is placed on hold and is periodically prompted to find out if they want to simply leave a voice mail. If the subscriber is unable to be reached, additional routing options may also be pre-defined by the subscriber. Such additional options may include taking a message, routing to the subscriber's voice mail box, playing a recorded announcement (the announcement can be generic simply indicating the subscriber's schedule or it can be specific to the caller, giving the caller information that he/she may need) and paging the subscriber while the caller waits on hold to be connected once the subscriber calls in to the platform.

Another route option may be to provide fax or e-mail services to the caller. For example, a subscriber may provide access for their callers to sales (or other) literature via fax-on-demand, voice response, WEB or other. The literature is either stored in the profile or in a separate application database. As another example, the caller may be able to leave a voice message for the caller and request that the voice message be faxed or e-mailed to the subscriber. (The subscriber may also request voice messages be faxed or e-mailed to him/her.)

Figure 9:
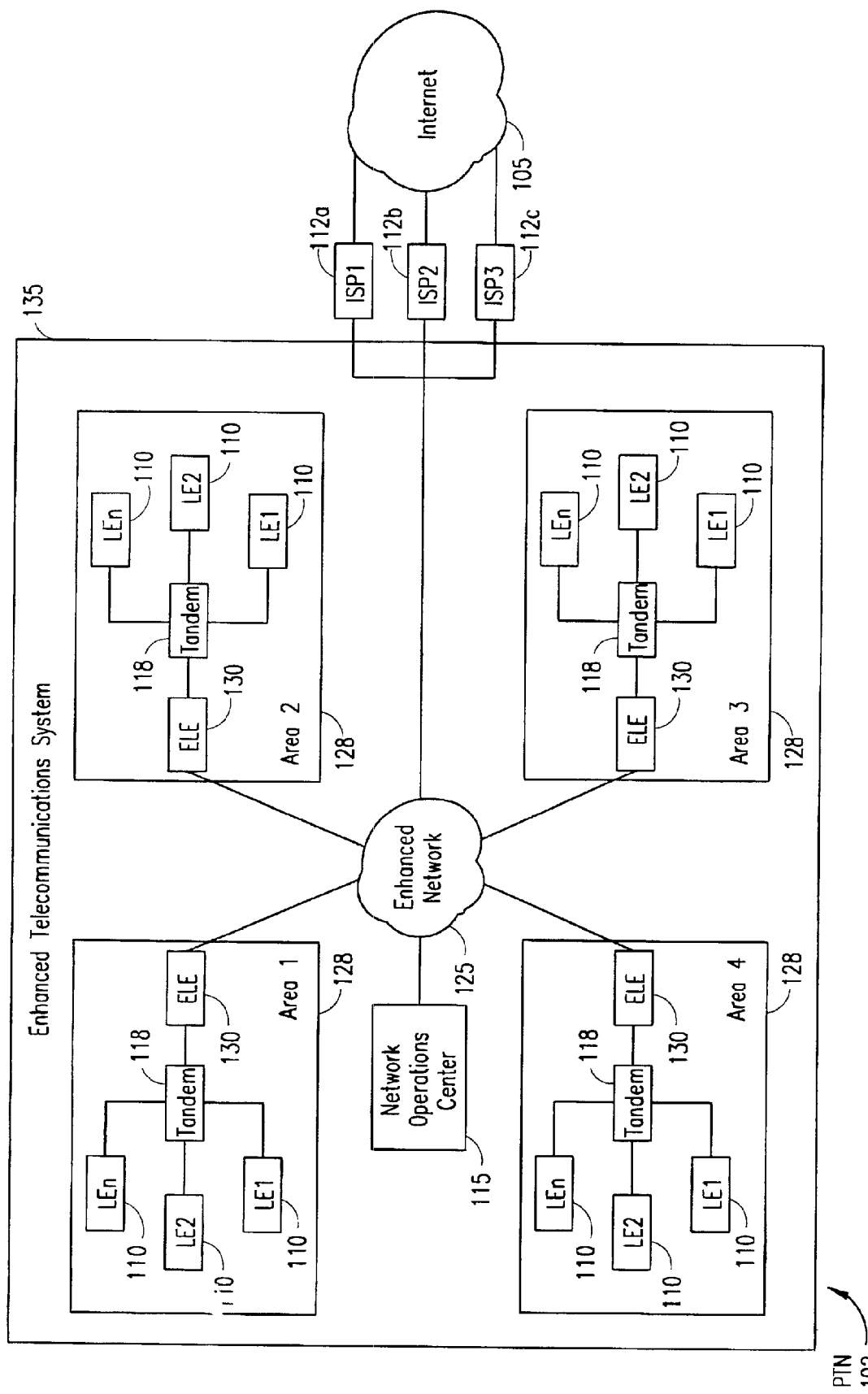
FIG. 9 is a block diagram illustrating the implementation of multiple enhanced local exchanges to create an enhanced telecommunications system.

Referring now to FIG. 9, there is illustrated a block diagram of an enhanced telecommunications system, which includes multiple enhanced local exchanges of the type shown in FIGS. 2 and 4. Each ELE 130 is connected to a Tandem Office 118 in an area 128 to allow convenient access for local service without having to directly connect to every Central Office (traditional local exchange) 110. As discussed hereinbefore in connection with FIG. 3, subscribers can port their local telephone numbers over to the ELE 130, which is capable of providing enhanced services (via the enhanced services platform) as a replacement to their current local service.

All of the ELE's 130 are interconnected via an enhanced network 125 using ATM, VoIP, TCP/IP, and T1 for the purposes of transporting voice and data. Each ELE 130 is also connected to a Network Operations Center 115, which provides real-time alarms and allows for remote standard maintenance and provisioning functions. The enhanced network 125 is also connected to multiple Internet Service Providers (ISPs) 112a–c to allow subscriber Internet/WEB 105 access to their subscriber profiles and the enhanced services via the web-activated interface.

The Network Operations Center (NOC) 115 may also serve as a gateway into the enhanced network 125. For example, since the ANI provides the caller's location, the ANI may cause the call to be routed into the Network Operations Center 115 for the geographic region of caller (i.e. a subscriber calling from New York is routed into the appropriate Northeastern NOC).

As will be recognized by those skilled in the art, the innovative concepts described in the present application can be modified and varied over a wide range of applications. Accordingly, the scope of patented subject matter should not be limited to any of the specific exemplary teachings discussed, but is instead defined by the following claims.

What is claimed is:

1. An enhanced telecommunications system for providing a plurality of enhanced telecommunications services to subscribers, said system comprising:

at least one enhanced exchange having an enhanced services platform thereon, said enhanced services platform being capable of providing the plurality of enhanced telecommunications services, each said enhanced services platform having a voice-activated interface therein to enable the subscribers to access at least one of the plurality of enhanced telecommunications services;

an enhanced network interconnecting each of said at least one enhanced exchange; and a network operations center connected to each said at least one exchange via said enhanced network, said network operations center being capable of remotely maintaining and configuring each said at least one enhanced exchange.

2. The system of claim 1, wherein each said at least one enhanced exchange is located in a different area.

3. The system of claim 2, wherein each said at least one exchange is connected to a respective tandem switch for the respective area.

4. The system of claim 1, wherein said enhanced network is further connected to a data network.

5. The system of claim 4, wherein said enhanced services platform has a web-activated interface therein for enabling the subscribers to access at least one of the plurality of enhanced telecommunications services via said data network.

6. A method for enabling an enhanced telecommunications system to provide a plurality of enhanced telecommunications services to subscribers, said method comprising the steps of:

providing at least one enhanced exchange within a public telephone network, each said at least one enhanced exchange having a service platform thereon that is capable of providing the plurality of enhanced telecommunications services and using a voice-activated interface to enable the subscribers to access at least one of the plurality of enhanced telecommunications services; and interconnecting each of said at least one enhanced exchange with a network operations center via an enhanced network, said network operations center being capable of remotely maintaining and configuring each said at least one enhanced exchange.

7. The method of claim 6, wherein said step of providing further comprises the steps of:
locating each said at least one enhanced exchange within a different area; and
connecting each said at least one exchange to a respective tandem switch for the respective area.

8. The method of claim 6, further comprising the step of:
connecting said enhanced network to a data network.

9. The method of claim 8, wherein each service platform is capable of activating a web-activated interface to enable the user to access at least one of the plurality of enhanced telecommunications services via said data network.

* * * * *

INTER PARTES REEXAMINATION CERTIFICATE (0128th)

United States Patent
Liljestrand et al.

(10) Number: US 6,853,714 C1
(45) Certificate Issued: Dec. 22, 2009

(54) APPARATUS AND METHOD FOR PROVIDING ENHANCED TELECOMMUNICATIONS SERVICES

(75) Inventors: Keith A. Liljestrand, Plano, TX (US); Christopher G. Kingsley, Coppell, TX (US); Jeffrey R. Myint, Plano, TX (US)

(73) Assignee: Wavport, LLC, Dallas, TX (US)

Reexamination Request:
No. 95/001,024, Dec. 31, 2007
No. 95/001,034, Mar. 19, 2008

Reexamination Certificate for:
Patent No.: 6,853,714
Issued: Feb. 8, 2005
Appl. No.: 09/792,207
Filed: Feb. 23, 2001

Related U.S. Application Data

(60) Provisional application No. 60/185,204, filed on Feb. 25, 2000.

(51) Int. Cl.
*H04M 3/42* (2006.01)
*H04M 7/00* (2006.01)
*H04Q 3/00* (2006.01)

(52) U.S. Cl. .............................. 379/201.03; 379/201.02
(58) Field of Classification Search ........................ None
See application file for complete search history.

(56) References Cited

U.S. PATENT DOCUMENTS

| | | |
|---|---|---|
| 5,479,488 A | 12/1995 | Lennig et al. |
| 5,581,600 A | 12/1996 | Watts et al. |
| 5,712,903 A | 1/1998 | Bartholomew et al. |
| 5,771,273 A | 6/1998 | McAllister et al. |
| 5,835,570 A | 11/1998 | Wattenbarger |
| 5,838,768 A | 11/1998 | Sumar et al. |
| 5,958,016 A | 9/1999 | Chang et al. |
| 6,049,594 A | 4/2000 | Furman et al. |
| 6,850,977 B2 | 2/2005 | Barnhouse et al. |
| 6,870,921 B1 | 3/2005 | Elsey et al. |
| 7,145,898 B1 | 12/2006 | Elliott |

FOREIGN PATENT DOCUMENTS

WO    WO 98/37688    8/1998

OTHER PUBLICATIONS

Richard B. Robrock II, *The Intelligent Network—Changing the Face of Telecommunications*, Proceedings of the IEEE, vol. 79, No. 1, Jan. 1991, pp. 7–20.

Simeonov, P., et al., *@INGate: A Distributed Intelligent Network Approach to Bridge Switching and Packet Networks*, Proc. of the Sixth Int'l Conference on Computer Comms. and Networks, published Sep. 22–25, 1997.

Northern Telecom, Telephony 101: A Basic Introduction to How Telephone Services are Delivered in North America, published Apr. 1997, pp. 1–107.

Dufour, I.G., ed., Network Intelligence, Chapman & Hall, $1^{st}$ ed., published 1997.

Harris, S., et al., *Advanced Personal Mobility Services*, British Telecommunications Engineering, vol. 16, pp. 100–105, published Jul. 1997.

Rieken, R., et al., *Provision of Integrated Services—The Service Node Approach*, Intelligent Network Workshop, 1997, IN '97, 4–7, published May 1997.

Fairbrother, Helen A., et al., *AT&T Chat 'N Talk: Getting to Know You without Getting to Know All About You*, published Jun. 3, 1999 at the Fifth Conference on Human Factors and the Web, at Gaithersburg, MD.

*Primary Examiner*—Ovidio Escalante

(57) ABSTRACT

An apparatus and method is disclosed for providing transparent enhanced telecommunications services to subscribers by implementing an enhanced services platform on a local network exchange within the public telephone network. More specifically, the apparatus and method of the present invention is capable of providing a plurality of enhanced telecommunications services to a subscriber by using a voice-activated interface to enable the subscriber to access at least one of the plurality of enhanced telecommunications services. In addition, the apparatus and method of the present invention may use a web-activated interface to enable the subscriber to access at least one of the plurality of enhanced telecommunications services.

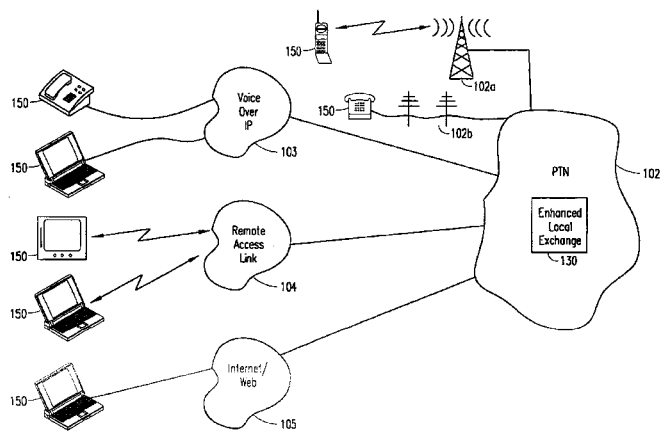

INTER PARTES REEXAMINATION CERTIFICATE ISSUED UNDER 35 U.S.C. 316

THE PATENT IS HEREBY AMENDED AS INDICATED BELOW.

AS A RESULT OF REEXAMINATION, IT HAS BEEN DETERMINED THAT:

Claims 1–9 are cancelled.

\* \* \* \* \*